United States Patent
Slegers

(10) Patent No.: US 6,646,392 B2
(45) Date of Patent: Nov. 11, 2003

(54) CIRCUIT ARRANGEMENT FOR OPERATING A DISCHARGE LAMP

(75) Inventor: Frans Slegers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/270,963

(22) Filed: Oct. 15, 2002

(65) Prior Publication Data

US 2003/0151377 A1 Aug. 14, 2003

(30) Foreign Application Priority Data

Oct. 18, 2001 (EP) .............................................. 01203978

(51) Int. Cl.$^7$ .............................. G05F 1/00; H05B 37/02
(52) U.S. Cl. ......................................... 315/291; 315/307
(58) Field of Search ................................... 315/291, 307, 315/DIG. 5, DIG. 7, 224, 244

(56) References Cited

U.S. PATENT DOCUMENTS

| | | | | |
|---|---|---|---|---|
| 5,608,294 A | * | 3/1997 | Derra et al. ................. | 315/224 |
| 5,742,132 A | * | 4/1998 | Huber et al. ............. | 315/209 R |
| 5,932,976 A | * | 8/1999 | Maheshwari et al. ........ | 315/291 |
| 5,962,981 A | | 10/1999 | Okude et al. ................ | 315/128 |
| 6,294,880 B1 | * | 9/2001 | Deurloo et al. ............. | 315/224 |

* cited by examiner

Primary Examiner—Don Wong
Assistant Examiner—Minh D A

(57) ABSTRACT

During stationary operation a circuit arrangement for operating a high-pressure discharge lamp supplies a direct current to the lamp which is commutated at a low-frequency. During take-over, between ignition and stationary operation, a high frequency current is supplied to the lamp after each commutation during a time interval that is shorter than half a cycle of the commutation. By supplying the lamp in this way, it forms a smaller load during take-over, so that the requirements that the circuit arrangement has to meet are less severe.

4 Claims, 2 Drawing Sheets

CIRCUIT ARRANGEMENT FOR OPERATING A DISCHARGE LAMP

BACKGROUND OF THE INVENTION

The invention relates to a circuit arrangement for operating a discharge lamp, which discharge lamp is connected in a commutation circuit such that a comparatively low-frequency square-wave supply voltage with a comparatively low or medium amplitude is supplied to the lamp in the normal operational phase of the lamp, in which an arc discharge takes place continuously in the lamp, whereas a comparatively high-frequency square-wave supply voltage with a comparatively high amplitude is supplied to the lamp in an ignition phase preceding said normal operational phase.

Such a circuit arrangement is known from U.S. Pat. No. 5,932,976.

More in particular, the invention relates to a phase lying between the ignition phase and said normal operational phase, when no reliable, permanent ignition of the lamp has taken place yet. This phase will be denoted the take-over phase for short hereinafter. In this take-over phase, a comparatively strong charging/discharging current will flow through a capacitor connected in a usual manner in parallel to the discharge lamp, which current constitutes a major load on the supply circuit, which supply circuit in its turn supplies the commutation circuit, and on the switching transistors of the commutation circuit.

U.S. Pat. No. 5,962,981 discloses a circuit arrangement for a discharge lamp, in which patent document the problem is addressed of excessive charging and discharging currents of the lamp capacitor which occur in a run-up phase prior to the normal operational phase, but not of the load formed thereby on the supply circuit which in its turn supplies the commutation circuit.

The invention has for its object to provide a circuit arrangement of the kind mentioned above in which a reduced load on the supply source supplying the commutation circuit is obtained in the take-over phase, so that a higher voltage is maintained than would otherwise be the case at the output of said supply source, which usually has a capacitor connected in parallel which is to supply all power for the ignition circuit and the lamp, so that it is better able to supply the necessary power for heating up the electrodes of the lamp by means of glow discharges and for subsequently igniting a discharge arc in the lamp.

BRIEF SUMMARY OF THE INVENTION

According to the invention, the object is achieved by means of a circuit arrangement for operating a discharge lamp, which discharge lamp is connected in a commutation circuit such that a comparatively low-frequency square-wave supply voltage with a comparatively low or medium amplitude is supplied to the lamp in the normal operational phase of the lamp, in which an arc discharge takes place continuously in the lamp, whereas a comparatively high-frequency square-wave supply voltage with a comparatively high amplitude is supplied to the lamp in an ignition phase preceding said normal operational phase, and a supply source is connected to the commutation circuit, which supply source in its turn supplies the commutation circuit and which supply source is characterized in that, in a take-over phase between said ignition phase and said operational phase, the comparatively low-frequency square-wave supply voltage is suppressed in the initial portion of each half cycle thereof, such that the duty cycle of each wave is reduced and instead of this comparatively low-frequency square-wave supply voltage a comparatively high-frequency square-wave supply voltage is fed to the lamp.

According to the cited U.S. Pat. No. 5,962,981, it is true that a high-frequency switching of the switching transistors of the commutation circuit takes place in an initial period of the low-frequency switching, but no comparatively high-frequency square-wave supply voltage is fed to the lamp as a result of this; on the contrary, a comparatively low-frequency square-wave supply voltage/current is still fed to the lamp during the high-frequency switching of the switching transistors (FIGS. 18, 20, 22).

According to the invention, therefore, a comparatively high-frequency square-wave supply voltage is fed to the lamp in the initial portion of each half cycle of the comparatively low-frequency square-wave supply voltage, in which the square-wave is suppressed and the remaining portion of the half cycle accordingly has a duration which is shorter than that of half a cycle of the low-frequency supply voltage, or of which the duty cycle is below 100% in relation to the half cycle.

The "comparatively high frequency" is understood to be, for example, a frequency of 50 kHz or even 200 kHz, as against the frequency of 90 Hz in the normal operational phase in which the lamp is "on".

A result of the above measure according to the invention is that, as was found in practice, glow discharges arise in the lamp at a low current level in the take-over phase while the comparatively high-frequency square-wave supply voltage is being applied to the lamp, and that ending of the comparatively high-frequency square-wave supply voltage and the actual start of the next (shortened) half cycle of the comparatively low-frequency square-wave supply voltage leads to a current pulse load on the supply source supplying the commutation circuit which is substantially smaller (3 A against 13 A in a practical case) than that which would occur without the measure according to the invention. Not only does this decrease the load on said supply source, with the result that the output capacitor thereof can charge up to a higher voltage, but the current load on the switching transistors of the commutation circuit is also reduced, so that lighter transistors can be used.

The initial portion of each half cycle of the comparatively low-frequency square-wave supply voltage, in which the relevant square wave voltage is suppressed and the comparatively high-frequency square-wave supply voltage is present in its place, may have a duration of 100% in the beginning down to 0% at the end of the take-over phase, percentages relating to the duration of one block of the comparatively low-frequency supply voltage or the half cycle of the frequency thereof, so that in this way a gradual decrease in the high-frequency commutation of the commutation circuit and a gradual increase of the low-frequency commutation take place in an interrelated manner over a duration which may be set empirically to the most effective value.

The invention will now be explained in more detail with reference to the drawing, in which:

DETAILED DESCRIPTION OF THE INVENTION

Figure 1:
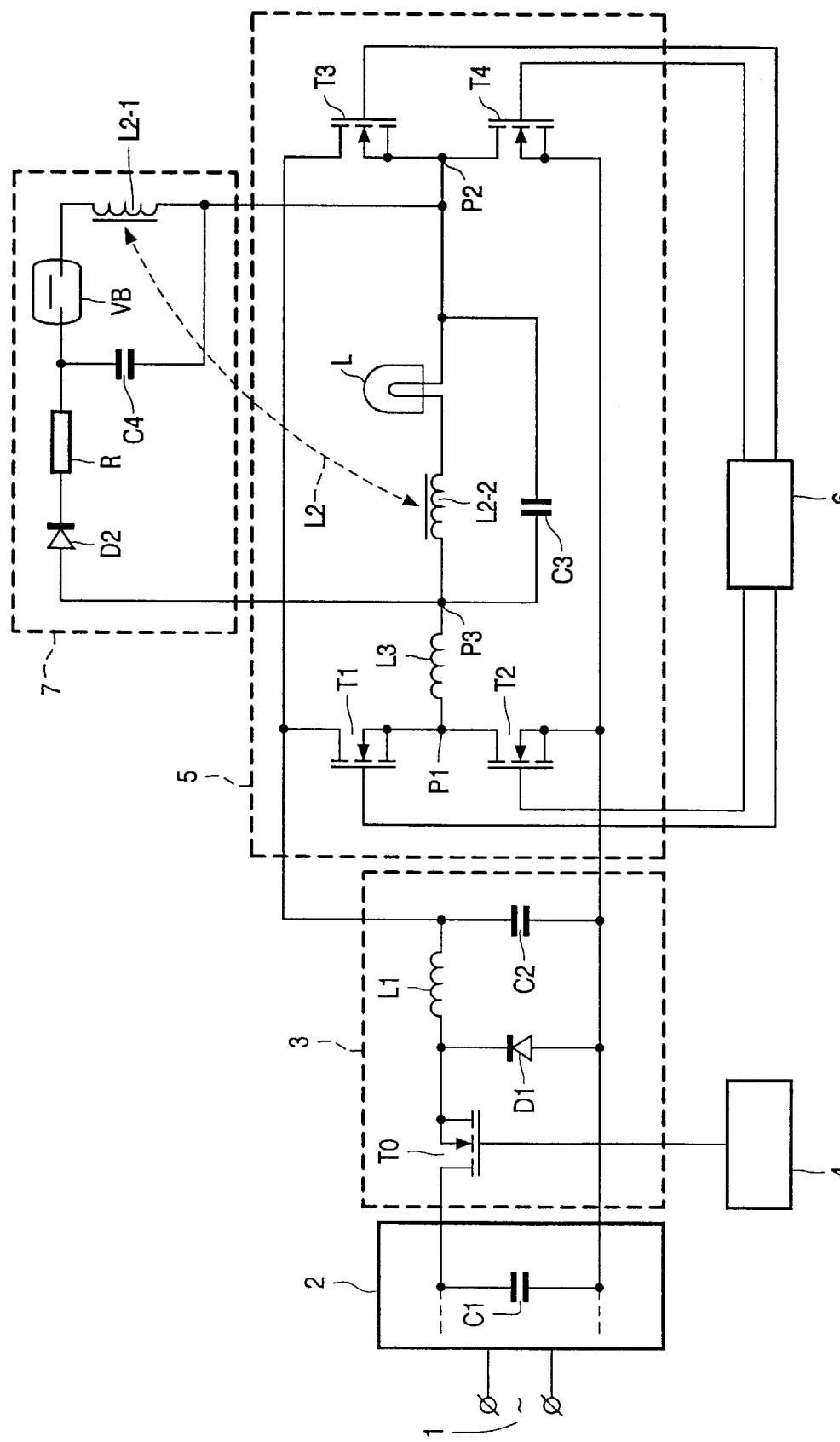
FIG. 1 is a circuit diagram of a usual circuit arrangement for operating a HID lamp in a simplified representation, leaving out details which are not necessary for an understanding of the present invention.

The circuit arrangement of FIG. 1 comprises an AC/DC conversion circuit 2 connected to an AC mains 1, the capacitor C1 being the output capacitor.

A controlled/switched DC/AC converter circuit 3 is connected to the converter circuit 1, which circuit 3 is also denoted a "chopper", comprising an incorporated switching transistor T0, a diode D1, a coil L1, and an output capacitor C2. This converter circuit is used in a known manner inter alia for stabilizing the lamp current in the normal operational phase in which the lamp is "on" under the control of a control circuit 4.

A commutation circuit 5 with switching transistors T1 to T4 controlled by a control circuit 6 is connected to the converter circuit 3. A series arrangement of the coil L3, the secondary winding L2-2 of an ignition transformer L2, and the electrical connections of the lamp L is present in the diagonal P1/P2 of the bridge-type commutation circuit 5. The capacitor C3 (the lamp capacitor) is connected in parallel to the series arrangement of L2-2 and the lamp connection terminals.

An ignition circuit 7 comprising the diode D2, the resistor R, the capacitor C4, a spark bridge VB or some other voltage-sensitive switch, and the primary winding L2-1 of the ignition transformer L2 is connected to the terminals P3 and P4 of the diagonal P1-P2 of the bridge-type commutation circuit 5. The lamp L is, for example, a HID lamp, i.e. a discharge lamp with a High Intensity Discharge (HID).

The operation of the conventional circuit described up to the present point is as follows, in as far as relevant for understanding the present invention.

During operation, i.e. in the ignition phase, a DC voltage of, for example, 400 V occurs across the output capacitor C2 of the converter circuit 3. The transistors T1 to T4 of the commutation circuit 5 are alternately switched into conduction ("on") in pairs T1, T4, and T2, T3, by the control circuit 6 with a comparatively high switching frequency of, for example, 100 kHz.

The voltage of 400 V is stepped up to, for example, 800 V by the resonance effect of the coil L3 and the capacitor C3. This increased voltage between the terminals P1 and P2 of the diagonal is supplied to the ignition circuit 7, in which the capacitor C4 is charged up to this increased voltage through the diode D2 and the resistor R. The spark bridge VB breaks down when the capacitor C4 has a voltage of approximately 800 V, so that the capacitor C3 is discharged through the primary winding of the ignition transformer L2. Owing to the high winding ratio between the secondary ignition pulse of, for example, 200 kV arises across the secondary winding L2-2.

The ignition phase, which may have a duration of the order of, for example, 1 second, is normally followed by a phase of low-frequency switching or commutating of the commutation circuit 5 at a frequency of, for example, 90 Hz. The low-frequency switching of the switching transistors T1 to T4 creates a low-frequency square-wave supply voltage across the diagonal P1-P2 with the cycle time T of the low switching frequency of, for example, 90 Hz (FIG. 2A).

Each low-frequency commutation of the commutation circuit 5 will cause a major current pulse which re-charges the capacitor C3 from one polarity to the other polarity and which flows away through the lamp in those moments in which the lamp is ignited by an ignition pulse. As long as a permanent "on"-condition of the lamp does not occur, therefore, major current pulses will flow periodically, which form a major load on the capacitor C2 which is the supply source of the commutation circuit. This will be the case to an even greater extent if the coil L3, which also has a current-limiting effect, is reduced in size or is omitted for financial reasons.

To reduce the load on the capacitor C2, according to the invention, it is now proposed to use a supply voltage P1–P2 (FIG. 2D) in which high-frequency commutations take place prior to each low-frequency commutation of the commutation circuit 5. The hybrid or interrelated low-frequency/high-frequency supply voltage shown in FIG. 2D may be thought of as being composed of a merging together of a low-frequency interrupted square-wave supply voltage as shown in FIG. 2B and a high-frequency interrupted square-wave supply voltage as shown in FIG. 2C.

Figure 2A:
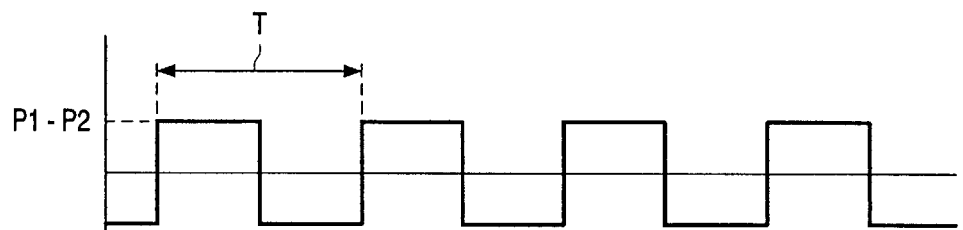
FIG. 2 shows a few waveforms, illustrating the manner in which the lamp supply voltage is formed according to the invention.
Figure 2B:
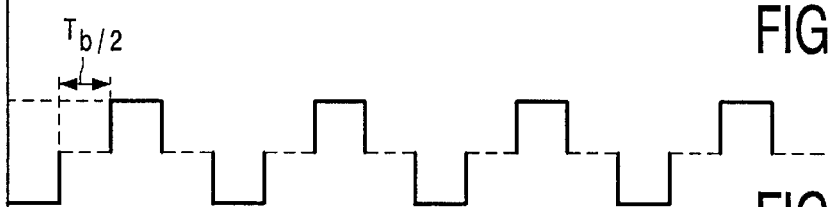
Figure 2C:
Figure 2D:
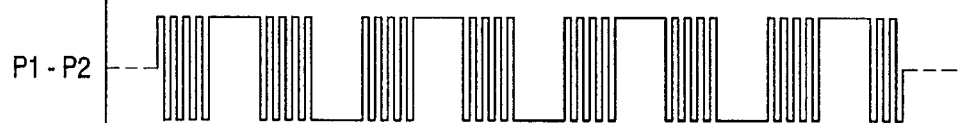

In FIG. 2B, the initial portion of each block or half wave of FIG. 2A is suppressed for a duration Tb/2, whereby the duty cycle of each block is reduced in a ratio 1-Tb/T, and a high-frequency square-wave supply voltage is delivered during each initial portion having the duration Tb/2, i.e. in bursts with the duration Tb/2, each burst comprising a number of blocks of short duration as compared with the duration Tb/2 of the period in which the high-frequency cycles take place. This latter frequency may be as high as 50 kHz or 100 kHz, and the number of cycles of the high-frequency square-wave supply voltage within a duration Tb/2 of, for example, 2.5 ms may then be, for example, 125.

Figure 2E:
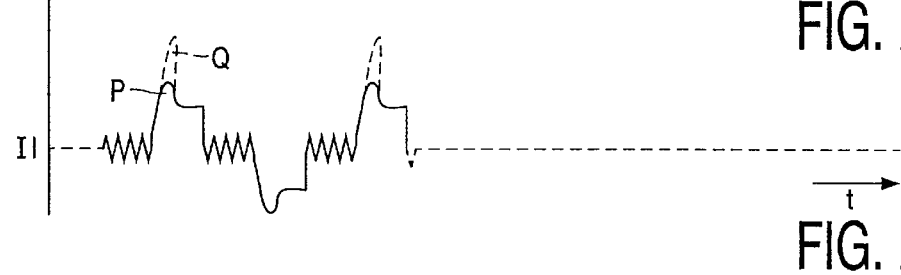

The inventors have found that glow discharges occur in the lamp during each high-frequency burst, which glow discharges give rise to a lamp current I1 (FIG. 2E) with a comparatively low value of, for example, approximately 0.5 A, in which case the glow voltage may be approximately 230 V. Upon the switch-over of the supply voltage at the start of the next (shortened) block of the low-frequency supply voltage, a current pulse P then arises with a peak whose value is not so high any more after a sufficiently long duration of the preceding high-frequency burst as would be the case without such a burst (Q, FIG. 2E; 13 A). The high frequency in the above case was, for example, 200 kHz.

It will be clear from this that the output capacitor C2 of the supply circuit 3 is subject to a much lesser load and retains a higher voltage, so that the ignition circuit is caused to deliver an ignition pulse more often and in a more reliable manner, whereby a more reliable lamp ignition is achieved, to which the gradual heating up of the lamp electrode during the glow discharges also contributes. The reduction of the pulse current also renders it possible to use lighter types for the switching transistors T1 to T4.

Figure 3:
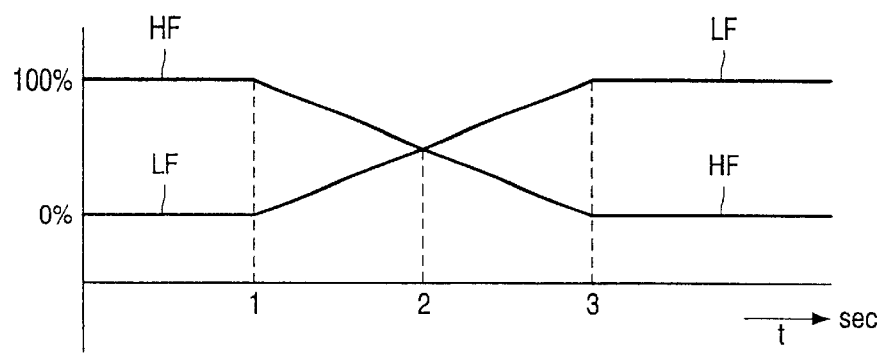
FIG. 3 is a diagram of the interrelated high-frequency and low-frequency commutation according to the invention.

The inventors have also found that it is advantageous to have the burst duration Tb/2 vary as a function of time from 100% of the half cycle T/2 in the beginning down to 0% at the end of the take-over phase, also in view of the effect of the glow discharges discussed above. This is pictured in FIG. 3, where the proportion of low-frequency (LF) and the proportion of high frequency (HF) is plotted in per cents on the vertical axis and time t on the horizontal axis. By way of example, moments at 1, 2, and 3 seconds are shown here, where accordingly 100% high-frequency switching takes place from 0 to 1 s, hybrid high-frequency and low-frequency switching according to the invention from 2 to 3 s, and 100% low-frequency switching after 3 s. It will be obvious that the values given here are meant for illustration only and that these values are to be determined empirically for each individual lamp type.

In view of the above description of the hybrid high-frequency and low-frequency supply voltage which is applied during a take-over phase between the ignition phase and the normal operational phase, it is deemed to lie within the powers of those skilled in the art to program the control circuit 6, which may a microcontroller or a microprocessor, such that it supplies a switching pattern for the switching transistors T1 to T4 of the commutation circuit 5 whereby the desired hybrid supply voltage (FIG. 2D) with a suppression and release cycle Tb/2 (FIG. 3) changing over time is supplied to the lamp.

What is claimed is:

1. A circuit arrangement for operating a discharge lamp, which discharge lamp is connected in a commutation circuit such that a comparatively low-frequency square-wave supply voltage with a comparatively low or medium amplitude is supplied to the lamp in the normal operational phase of the lamp, in which an arc discharge takes place continuously in the lamp, whereas a comparatively high-frequency square-wave supply voltage with a comparatively high amplitude is supplied to the lamp in an ignition phase preceding said normal operational phase, characterized in that, in a take-over phase between said ignition phase and said operational phase, the comparatively low-frequency square-wave supply voltage is suppressed in an initial portion of each half cycle wave thereof, such that the duty cycle of each wave is reduced, and instead of this comparatively low-frequency square-wave supply a comparatively high-frequency square-wave supply voltage is fed to the lamp.

2. A circuit arrangement as claimed in claim 1, characterized in that the duration of said initial portion in said take-over phase decreases in the course of time from 100% in the beginning to 0% at the end of the take-over phase, in relation to the duration of one half cycle of said low-frequency square-wave supply voltage.

3. A circuit arrangement as claimed in claim 1, comprising a microcontroller circuit connected to and controlling the commutation circuit, characterized in that said microcontroller circuit is programmed so as to supply a switching pattern to the commutation circuit such that the latter supplies a hybrid, interrelated high-frequency and low-frequency square-wave supply voltage (FIG. 2D) to the lamp in the take-over phase.

4. A circuit arrangement as claimed in claim 3, characterized in that the microcontroller circuit is programmed for causing the duration of the initial portion of each half cycle of the low-frequency square-wave supply voltage, in which a said voltage is suppressed, to decrease from 100% in the beginning to 0% at the end of the take-over phase, in relation to the duration of each half cycle of the low-frequency square-wave supply voltage.

* * * * *